United States Patent [19]
Beaver et al.

[11] 3,896,206
[45] July 22, 1975

[54] METHOD FOR FORMING AND CURING A FIBER REINFORCED HOLLOW EPOXY SHAFT

[75] Inventors: Guy Daniel Beaver, Wadsworth; Robert Cleland Young, Louisville; Donald Theodore Martin, Alliance, all of Ohio

[73] Assignee: The Babcock & Wilcox Company, New York, N.Y.

[22] Filed: June 25, 1973

[21] Appl. No.: 373,206

[52] U.S. Cl. ............... 264/258; 264/134; 264/137; 264/325
[51] Int. Cl. ............................ B29d 9/04; B29g 1/00
[58] Field of Search ........... 264/325, 134, 135, 136, 264/137, 258, 294, 296; 156/165

[56] References Cited
UNITED STATES PATENTS

| | | | |
|---|---|---|---|
| 2,202,042 | 5/1940 | Blount | 264/325 X |
| 2,710,026 | 6/1955 | Stewart | 264/137 X |
| 2,942,297 | 6/1960 | Michalko | 425/384 X |
| 3,655,863 | 4/1972 | Andersen | 264/325 X |

*Primary Examiner*—Richard R. Kucia
*Attorney, Agent, or Firm*—J. M. Maguire; E. A. Mosley

[57] ABSTRACT

A method of forming a fiber reinforced composite tapered shaft formed upon a tapered mandrel, and the shaft with the mandrel therein is molded in a mold with the mandrel longitudinally forced into the shaft to radially compress the shaft material under heating conditions and to thereby form a finished composite tapered shaft.

6 Claims, 2 Drawing Figures

METHOD FOR FORMING AND CURING A FIBER REINFORCED HOLLOW EPOXY SHAFT

The present invention relative to a method of curing a fiber reinforced plastic shaft, and more particularly to a mold for such a shaft and a method of compressing materials of the shaft in the mold prior to or during thermal treatment of the plastic.

In the manufacture of fiber reinforced plastic articles curing of the plastic becomes necessary. The materials are received in a compounded form where the fiber and the plastic matrix which may be a polymer or a resin, are laid up in a preferred form prior to curing of the finished article. Ordinarily, the material containing the fiber and its matrix is known as a molding compound, and where fibers are oriented in a preferred arrangement referred to as a prepreg. After the materials are laid up in the general form desired for the finished product they must be compacted to remove air and to fill any voids, prior to or during the application of heat. The application of heat and pressure is ordinarily used either separately or simultaneously to lower the viscosity of the plastic thereby helping remove the air, and finally curing the shape to its final configuration.

There are many methods for compacting the fiber reinforced plastic matrix. The most common methods utilize contact pressure produced by hand rollers or paddles. Sometimes pressure is applied by utilizing vacuum under a film. Autoclave processes are used which may combine the use of a vacuum with subsequent high pressure, such as for example 100 psi (pounds per square inch), admitted to force compaction of the fiber reinforced plastic material.

In accordance with the present invention the general principle of a wedge is used to compact a hollow tubular article made up of fiber reinforced plastic materials. More specifically a hollow tubular article is formed by wrapping layers of fiber preimpregnated with resin on a tapered mandrel. This assembly is placed in a mold cavity and the mandrel is forced into the mold to compact the fiber resin materials. It will be appreciated that the size of the tubular product so treated may be measured in inches or feet insofar as length is concerned and the thickness of the hollow article so compacted may be as little as one one-hundreth of an inch or several inches. In the drawings:

Figure 1:
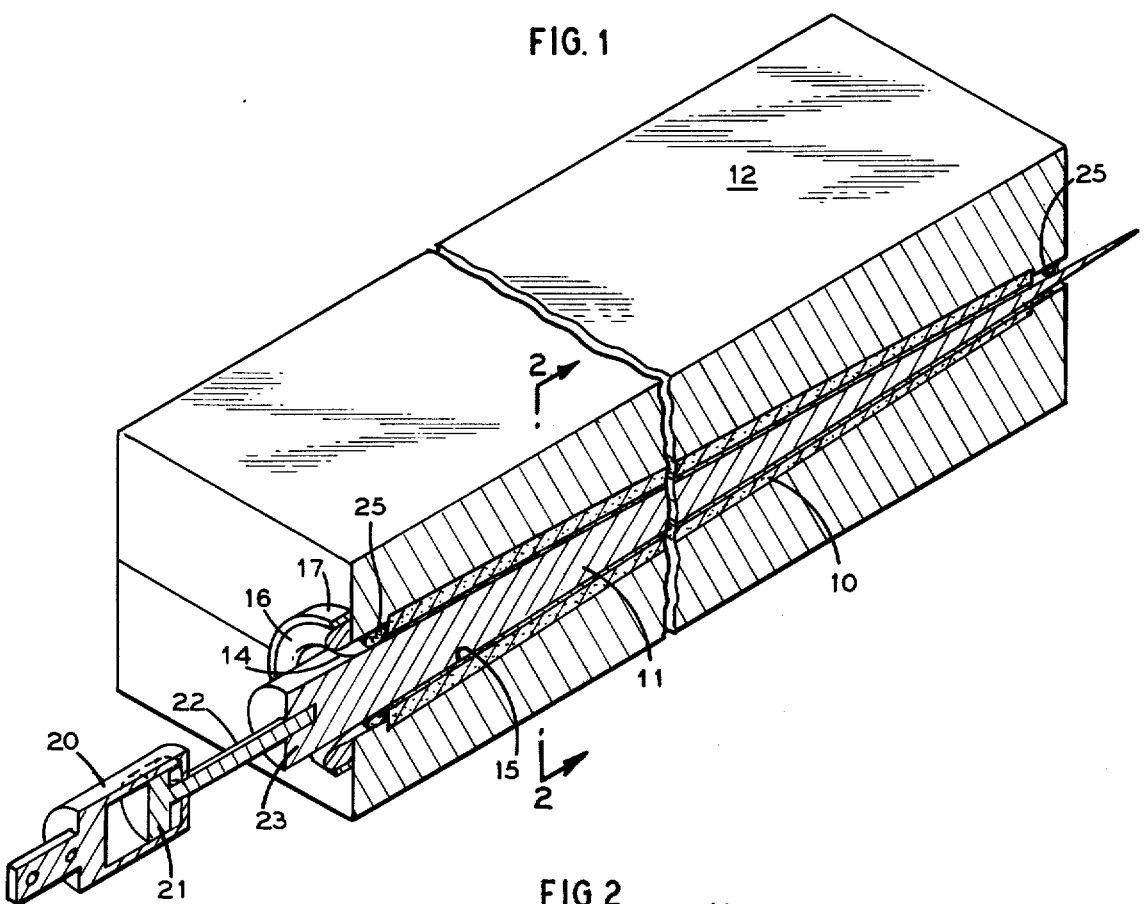
FIG. 1 shows in section, an isometric view of a hollow tubular shaft positioned in a mold in accordance with the invention.
Figure 2:
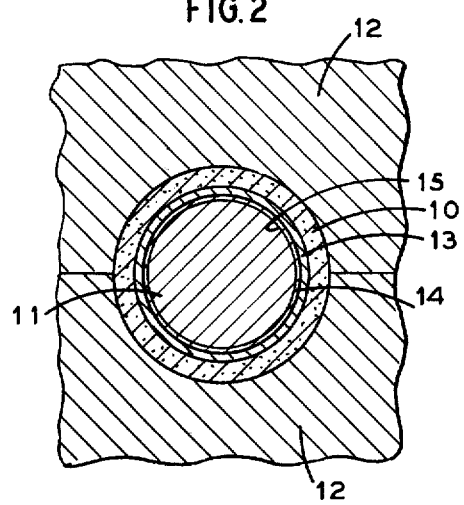
FIG. 2 is a section view taken on line 2—2 of FIG. 1.

In the illustrated embodiment of the invention, a fiber reinforced plastic shaft 10 is initially formed on a tapered mandrel 11 of circular cross section. The hollow tapered shaft 10 is installed in a two part steel mold 12 having a cavity therein. The innermost layer 13 of fiber reinforced plastic is constructed with the fibers 14 therein extending an appreciable distance beyond the nominal larger end 15 of the hollow shaft. These fibers extend around an annular rounded nose section 16 formed on the mold 12 and are locked in position by a clamp member 17 so as to anchor the longitudinal position of the innermost fiber reinforced layer 13 during the period of time that the fibers in the shaft are radially expanded to compress the hollow shaft 10, as hereinafter described.

A film or layer such as silicone rubber or fluorocarbon in either solid or liquid form one one-thousandth to one-tenth inch thick is positioned between the exterior surface of the mandrel 11 and the innermost layer 13 of the fiber reinforced resin of the shaft 10 to at least act as a partial lubricating and/or release agent. Thus when the mandrel 11 is moved longitudinally of the mold 12 the radial expansion of the shaft 10 will be possible. The use of the film combined with longitudinal fixing of the position of the inner layer 13 by the clamp 17 will permit compacting of the fiber reinforced plastic of the shaft without deleterious effects on the compressed and cured shaft.

The radial compression of the shaft 10 by longitudinal movement of the mandrel 11, (to the right in FIG. 1) may be accomplished by any suitable mechanism, such as a screw, jack or a pneumatic or hydraulic cylinder. As shown in FIG. 1, a cylinder 20 with a piston 21 therein having a piston rod 22 attached thereto. The rod 22 is detachably connected with the large end 23 of the mandrel 11, and with the cylinder fixed in its relationship to the mold 12, application of fluid pressure to the cylinder through conventional piping connections (not shown) will cause movement of the mandrel.

During the application of heat and compressive forces to the shaft 10 the viscosity of the plastic will be initially decreased, and it becomes necessary to seal the ends of the shaft 10 to prevent loss of plastic. Typicals seal rings 25 are shown at the opposite ends of the mold 12 cavity for this purpose.

In the embodiment of the invention shown the shaft 10 is formed on a tapered mandrel, as for example in the manner disclosed and claimed in a companion application by Kristina Lauraitis, Ser. No. 379,686, filed July 16, 1973. In this example the shaft is formed of multiple layers of organic fiber reinforced epoxy on a mandrel which uniformly tapers from about 0.5 inch at one end to about 0.1 inch at the other end in a length of approximately 45 inches. The exterior dimensions of the shaft so formed may vary within some fairly close limits depending upon the desired characteristics of the composite shaft, but in general terms the thickness of the wall will be about 0.1 inches and need not be of uniform thickness throughout its length.

The shaft formed as described, with its tapered mandrel, is positioned in the mold 12 where the cavity of the mold will have a configuration corresponding to the desired finished or cured shape. The hollow shaft, with its mandrel, might be considered in a raw state or condition, in so far as the curing procedure is concerned, when placed in the mold 12. The fibers 14 extending from the inner layer 15 are clamped to the mold over the annulus 16 by the clamp member 17 and the two portions of the mold are closed in a secured position. The rod 22 is then connected with the mandrel and the assembly is ready for final treatment by the application of compressive forces to and curing of the raw materials of the hollow multilayer fiber reinforced shaft.

To cure the fiber reinforced resin of the example given, a temperature of 250° to 350°F is required, for a period of time at temperature of between 10 and 120 minutes. Other plastic and thicker shapes may require other temperatures and periods of time, as well known in the art. The arrangements for heating the mold and the shaft therein is also well known in the art, and may take the form of external heating of the entire mold from an external source, or internal heating by passing hot fluids through passageways formed in the mold.

Electrical heating has also been utilized for mold heating purposes.

In the procedure of the present invention, pressure is applied to the mandrel 11 by the piston 21 while the tapered shaft is being heated. Ordinarily the pressure is increased as the shaft and mold temperature increases with a maximum desired pressure attained when the temperature reaches 200° to 350°F, depending upon the particular resin system.

The pressure applied is determined by the amount of radial displacement of the hollow shaft desired or required to attain the finished product. This in turn can be measured by the amount of longitudinal movement of the mandrel necessary to accomplish the desired result, or alternately movement may be regulated by the amount of pressure applied on the piston.

When sufficient displacement has been attained to achieve the desired compression of the hollow shaft, and the curing temperature has been maintained for a sufficient length of time the shaft is allowed to cool. Such cooling may be accomplished within the mold, i.e. the shaft is retained in the mold, with the mold cooled by natural heat radiation to the atmosphere. Alternately the mold 12 may be opened and the shaft removed for either forced or slow cooling depending upon the particular resin used in making the shaft. When the shaft has cooled, the mandrel will be driven from the shaft and the cured shaft is then ready for trimming to the precise length required. The surface can be finished with various coatings to produce the color, luster, or environmental protention required before assembly with the head of a golf club and a grip at the larger end.

It will be noted the mold cavity surface may be smoothly tapered or provided with a stepped taper, as desired. Furthermore, as hereinbefore pointed out the dimensions of the finished product may vary between wide limits, depending upon the end use of the tapered hollow product.

What is claimed is:

1. In the method of curing a tapered multilayered fiber reinforced plastic shaft having a tapered mandrel therein wherein the angle of mandrel taper is less than one degree, the intersurface between the exterior of the mandrel and the innermost layer of fiber reinforced plastic having a film of lubricant therebetween, the innermost layer of fiber reinforced plastic having the fibers therein extended beyond the other layers at the end of the shaft adjacent the larger end of the mandrel, the improved method comprising placing the shaft and mandrel in a mold, fixing the extended ends of the fibers of the innermost layer to the mold, heating the mold and the shaft therein to a selected temperature, forcing the tapered mandrel longitudinally into the shaft to exert an outward pressure on the shaft, controlling the longitudinal movement of the mandrel to determine the radial pressure exerted on the shaft, removing the mandrel and shaft from the mold, and removing the mandrel from the shaft.

2. In the method of claim 1 including maintaining the temperature of the shaft in the mold a selected period of time, and discontinuing heating of the mold to permit cooling thereof.

3. In the method of claim 2 wherein the shaft and mandrel are removed from the mold immediately after mold heating has been discontinued.

4. In the method of claim 1 wherein the shaft is heated to a temperature above 200°F before forcing the mandrel into the tapered shaft.

5. In the method of claim 1 wherein the shaft is heated to a maximum temperature of approximately 305°F.

6. In the method of claim 1 wherein layer of silicone rubber is applied to the mandrel before the layers of fiber reinforced polymer is placed thereon.

* * * * *

UNITED STATES PATENT AND TRADEMARK OFFICE
CERTIFICATE OF CORRECTION

PATENT NO. : 3,896,206
DATED : July 22, 1975
INVENTOR(S) : Guy D. Beaver et al

It is certified that error appears in the above-identified patent and that said Letters Patent are hereby corrected as shown below:

The address of inventor, Robert Cleland Young should read --Alliance--.

The address of inventor, Donald Theodore Martin should read --Louisville--.

Column 4, line 34 "305°F" should read --350°F--.

Signed and Sealed this

*thirtieth* Day of *December 1975*

[SEAL]

Attest:

RUTH C. MASON
*Attesting Officer*

C. MARSHALL DANN
*Commissioner of Patents and Trademarks*